United States Patent
Yasuda

(10) Patent No.: US 10,330,922 B2
(45) Date of Patent: Jun. 25, 2019

(54) BIAXIAL OPTICAL DEFLECTOR INCLUDING MULTIPLE MIRROR UNITS, LASER RADAR SYSTEM, AND MANUFACTURING METHOD

(71) Applicant: STANLEY ELECTRIC CO., LTD., Meguro-ku, Tokyo (JP)

(72) Inventor: Yoshiaki Yasuda, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 645 days.

(21) Appl. No.: 14/963,060

(22) Filed: Dec. 8, 2015

(65) Prior Publication Data
US 2016/0170202 A1 Jun. 16, 2016

(30) Foreign Application Priority Data
Dec. 10, 2014 (JP) ................. 2014-249824

(51) Int. Cl.
| G02B 26/08 | (2006.01) |
| G02B 26/12 | (2006.01) |
| G01S 7/481 | (2006.01) |
| G01S 17/93 | (2006.01) |

(52) U.S. Cl.
CPC ........ G02B 26/0858 (2013.01); G01S 7/4817 (2013.01); G01S 17/936 (2013.01); G02B 26/12 (2013.01); G02B 26/123 (2013.01)

(58) Field of Classification Search
CPC . G02B 26/0825; G02B 26/0858; G02B 26/12
See application file for complete search history.

(56) References Cited

U.S. PATENT DOCUMENTS

| 6,681,063 | B1 | 1/2004 | Kane et al. | |
| 2002/0034024 | A1 | 3/2002 | Orcutt et al. | |
| 2002/0131682 | A1* | 9/2002 | Nasiri | B81B 3/0062 385/18 |
| 2006/0132752 | A1* | 6/2006 | Kane | G01S 7/4817 356/5.02 |
| 2006/0274399 | A1 | 12/2006 | Yang | |
| 2007/0222678 | A1 | 9/2007 | Ishio et al. | |
| 2008/0100899 | A1* | 5/2008 | Shimokawa | B81B 3/004 359/225.1 |
| 2009/0001847 | A1* | 1/2009 | Tsuboi | B81B 3/0078 310/309 |
| 2011/0228440 | A1 | 9/2011 | Kato et al. | |
| 2014/0078519 | A1* | 3/2014 | Steffey | G01S 7/4817 356/625 |

(Continued)

FOREIGN PATENT DOCUMENTS

| CN | 103543526 A | 1/2014 |
| JP | 2008040240 A | 2/2008 |
| JP | 2010151958 A | 7/2010 |

OTHER PUBLICATIONS

Extended European Search Report dated Jul. 22, 2016, issued in counterpart European Application No. 15198702.1.
(Continued)

*Primary Examiner* — Eric L Bolda
(74) *Attorney, Agent, or Firm* — Holtz, Holtz & Volek PC

(57) ABSTRACT

In a biaxial optical deflector, multiple mirror units are arranged in an array. Each of the mirror units includes one mirror and one mirror driver coupled to said mirror for rocking the mirror.

11 Claims, 14 Drawing Sheets

(56) References Cited

U.S. PATENT DOCUMENTS

2014/0153001 A1   6/2014  Chayat et al.
2014/0159620 A1*  6/2014  Yamamoto ............ H01L 41/042
                                                    318/116
2015/0378011 A1* 12/2015  Owechko .............. G01S 7/4817
                                                    356/4.01
2016/0182892 A1*  6/2016  Ko ......................... G01S 17/89
                                                     348/46

OTHER PUBLICATIONS

Partial European Search Report dated Apr. 11, 2016, issued in counterpart European Application No. 15198702.1.
Yang, et al., "Phase synchronization of micro-mirror arrays using elastic linkages", ELSEVIER, Sensors and Actuators A, vol. 95, No. 1, Dec. 15, 2001, pp. 55-60.
Japanese Office Action dated Aug. 28, 2018 (and English translation thereof) issued in counterpart Japanese Application No. 2014-249824.

* cited by examiner

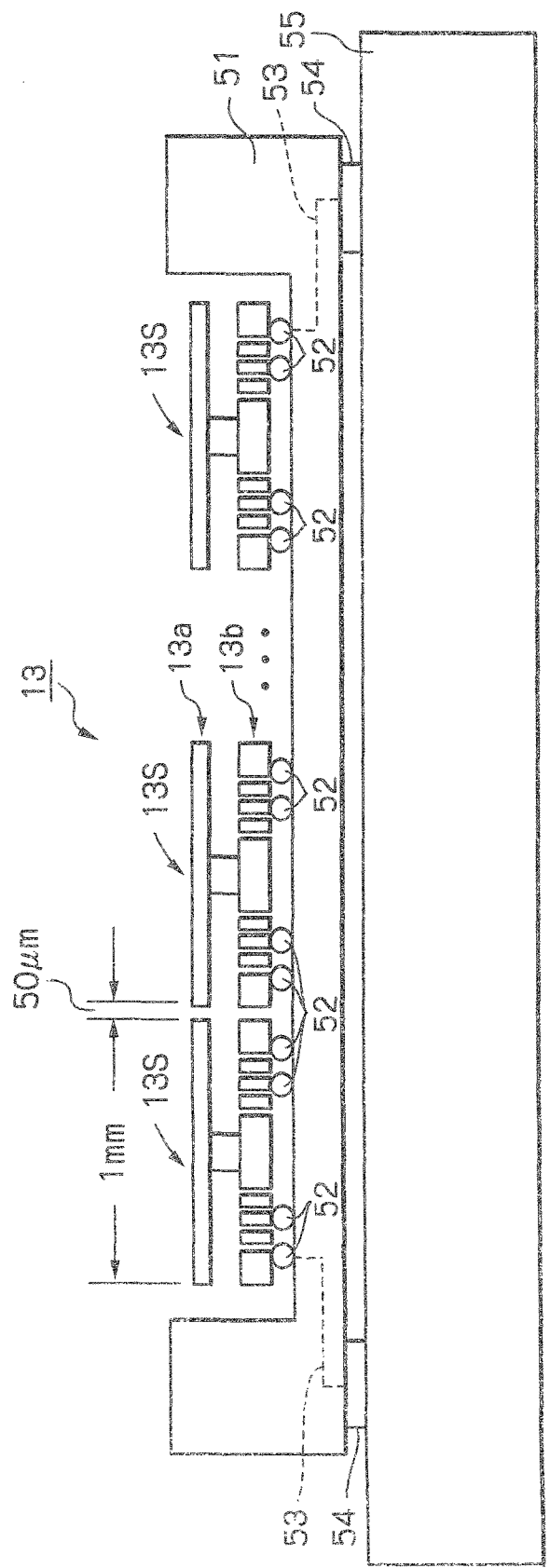

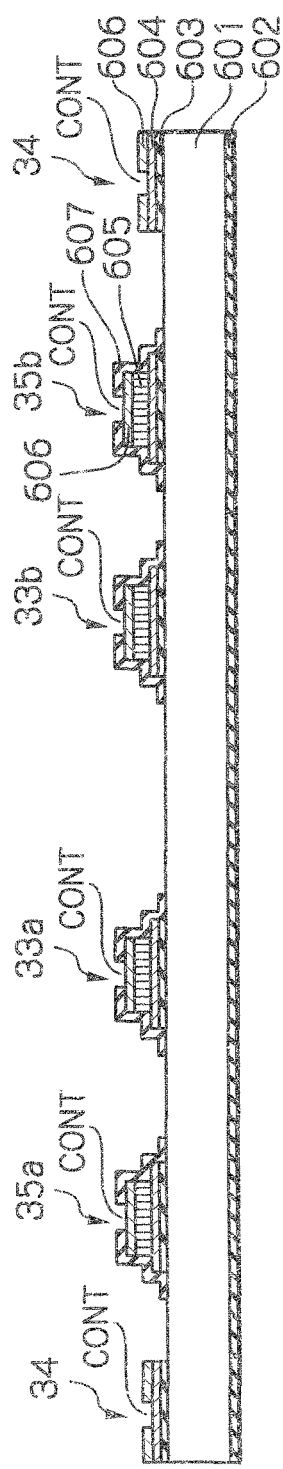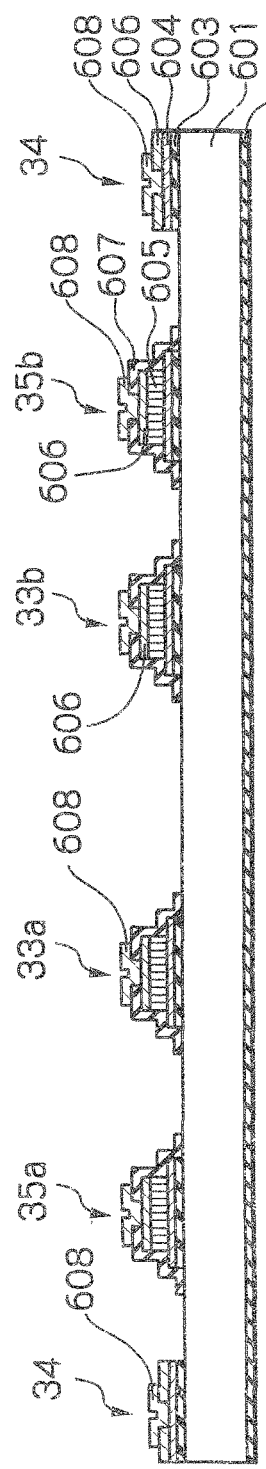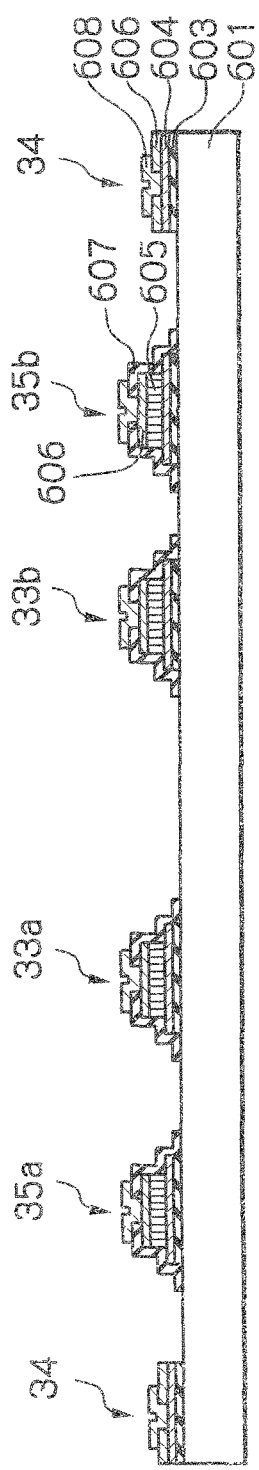

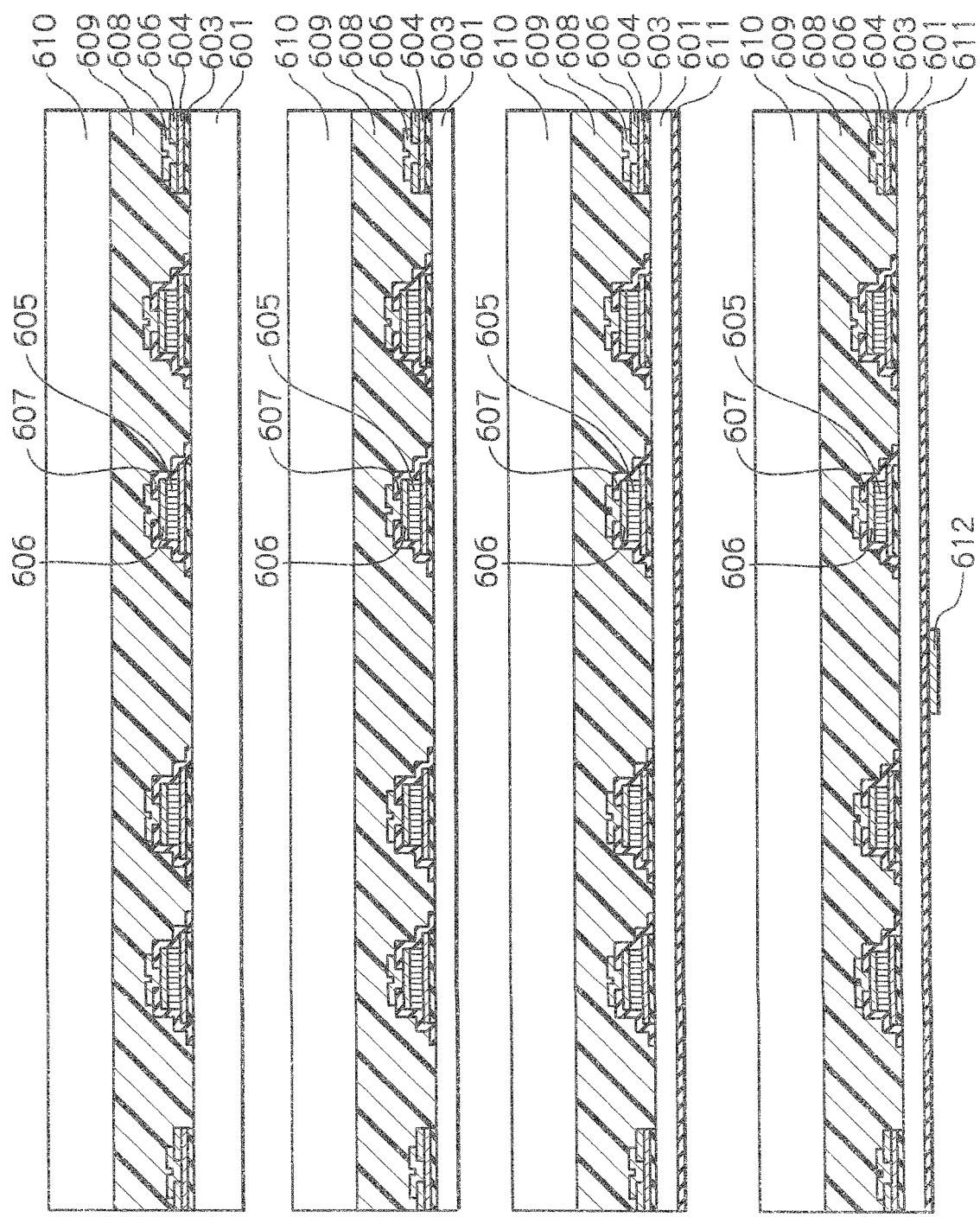

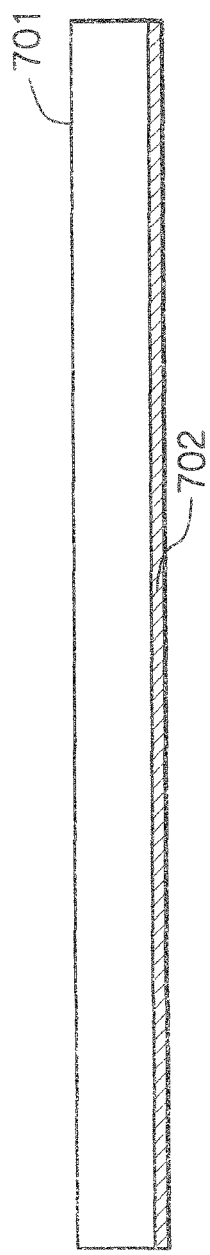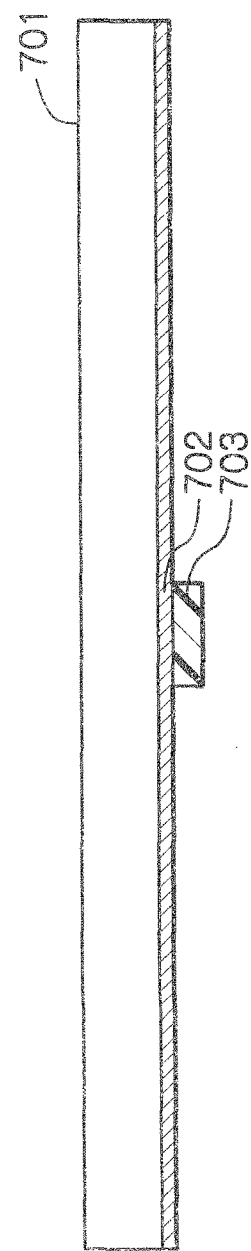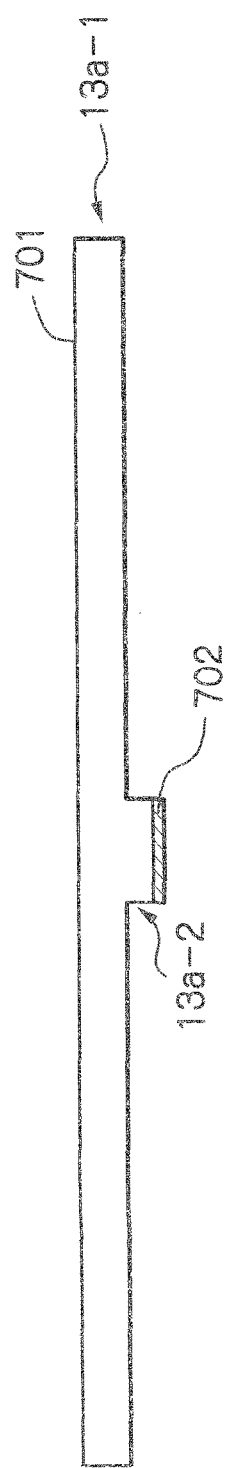

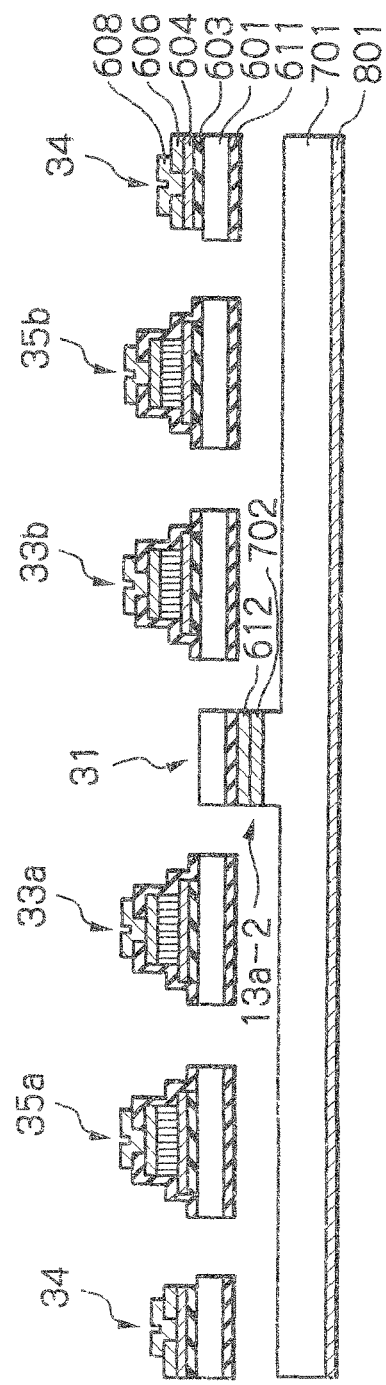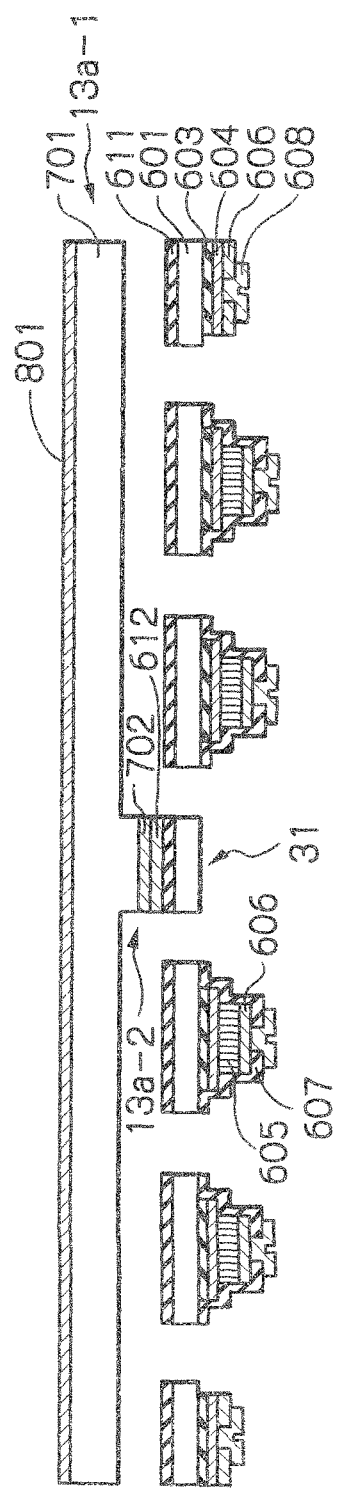

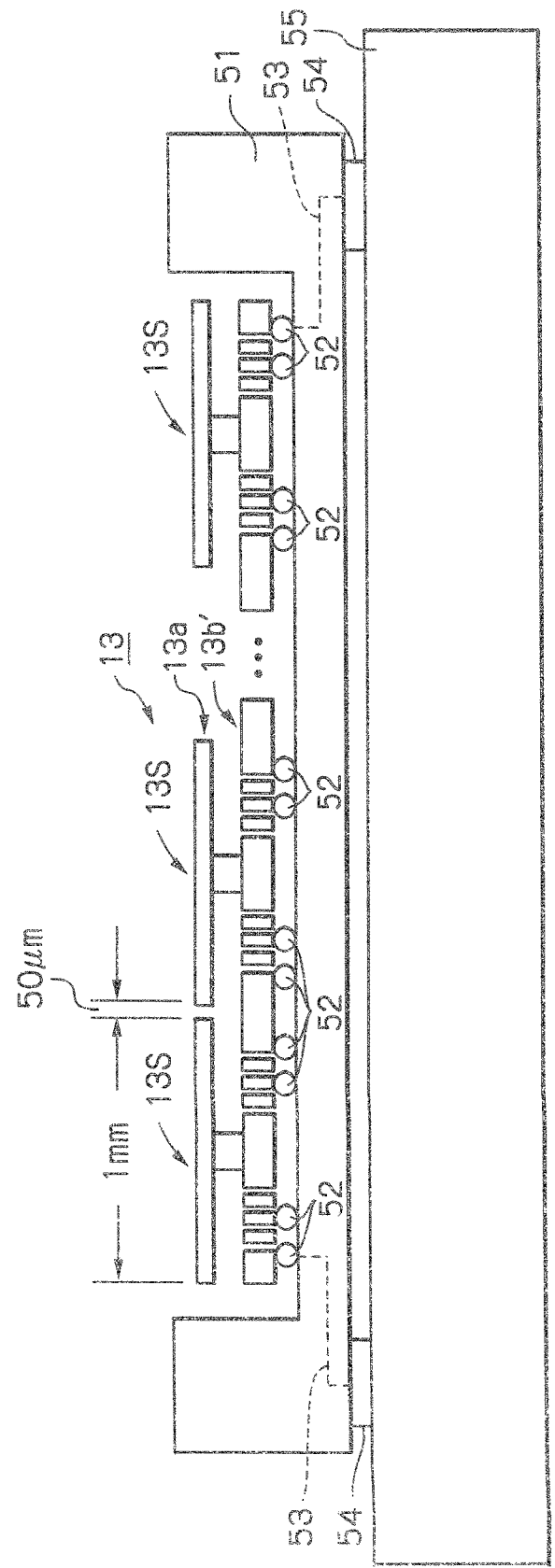

1

BIAXIAL OPTICAL DEFLECTOR INCLUDING MULTIPLE MIRROR UNITS, LASER RADAR SYSTEM, AND MANUFACTURING METHOD

This application claims the priority benefit under 35 U.S.C. § 119 to Japanese Patent Application No. JP2014-249824 filed on Dec. 10, 2014, which disclosure is hereby incorporated in its entirety by reference.

BACKGROUND

Field

The presently disclosed subject matter relates to a biaxial optical deflector, a radar system using the same and its manufacturing method.

Description of the Related Art

In an automobile safety system, a laser radar system is provided to detect a distance and angle between the driver's vehicle and its object or preceding vehicle. As a result, when the distance between the driver's vehicle and its preceding vehicle is smaller, the driver's vehicle is automatically decelerated for a time or a distance and, at worst, the driver's vehicle is stopped.

Such a laser radar system requires a function for scanning an object or a preceding vehicle at a wide angular view with a high angular resolution to avoid a dead space. Particularly, when the driver's vehicle is driving, the laser radar system requires a high speed scanning operation in addition to the high angular resolution. In order to provide such a high speed scanning operation and such a high angular resolution, a movable mirror such as a Galvano mirror or a polygon mirror is usually used; however, a micro electro mechanical system (MEMS) mirror (optical deflector) has recently been used.

On the other hand, in order to irradiate a preceding vehicle at a distance of 100 m ahead of the driver's vehicle with a collimated laser beam, the beam-diameter of the laser beam needs to be larger than about 2 to 3 mm, so that the size of the MEMS mirror needs to be larger. However, the larger the size of the MEMS mirror, the lower the operation speed of the MEMS mirror. Note that since the resonant frequency of the MEMS mirror for a wider angular scanning is about several hundreds of Hz, it is impossible to operate the MEMS mirror at a high scanning speed.

Also, in order to introduce a laser beam reflected from the preceding vehicle via the MEMS mirror to a photo detector, the optical source, the MEMS mirror and the preceding vehicle object and the photo detector form a coaxial optical system, to alleviate the effect of noise caused by external disturbances.

In view of the foregoing, a prior art laser radar system is constructed by a laser array light source including multiple laser light sources spaced from each other and a single MEMS mirror (see: JP 2010-151958A). In this prior art laser radar system, the laser light sources are sequentially turned on to realize a high speed scanning operation.

In the above-described prior art laser radar system, however, when the number of laser light sources is smaller, the angular view and angular resolution are limited. On the contrary, when the number of laser light sources is larger, the manufacturing cost would be increased. Also, it is difficult to continuously scan the irradiation angle of laser beam over the laser light sources, so that irradiation areas or areas scanned by the laser light sources are discrete, i.e., not continuous.

SUMMARY

The presently disclosed subject matter seeks to solve the above-described problems.

According to the presently disclosed subject matter, in a biaxial optical deflector, multiple mirror units are arranged in an array. Each of the mirror units includes one mirror and one mirror driver coupled to the mirror for rocking the mirror.

Also, a radar system includes: the above-mentioned biaxial optical deflector, wherein the mirror is defined as multiple mirrors and the mirror driver is defined as multiple mirror drivers; a control unit, connected to the biaxial optical deflector, for synchronously controlling the mirror drivers; a single light source, connected to the control unit, for emitting a first light beam to the biaxial optical deflector, so that the first light beam is reflected by the biaxial optical deflector to emit from the radar system; and a photo detector, connected to the control unit, for receiving a second light beam reflected by the biaxial optical deflector that receives the second light beam outside of the radar system.

Further, a method for manufacturing a biaxial optical deflector includes: forming two-dimensional actuators on a front side of a first wafer; forming mirror support poles on a rear side of a second wafer; wafer-bonding the rear side of the second wafer onto a rear side of the first wafer so that the mirror support poles are in contact with the rear side of the first wafer; etching the first wafer so that the two-dimensional actuators are separated from each other and the first wafer is separated into mirror drivers, after the wafer-bonding; dicing the second wafer so that the second wafer is separated into individual mirrors, after the etching; and packaging the mirror drivers and the mirrors each fixed to one of the mirror drivers in a package.

According to the presently disclosed subject matter, since a biaxial deflector is constructed by multiple mirror units, each of the mirror units can be operated for high speed scanning so that areas irradiated by the mirror units can be continuous, thus realizing a single large mirror.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIG. 5 is a cross-sectional view illustrating a package on which the mirror units of FIGS. 2A and 2B are mounted;

FIGS. 6A through 6K are cross-sectional views for explaining a method for processing a mirror driver wafer for the mirrors of FIGS. 2A and 2B;

FIGS. 7A, 7B and 7C are cross-sectional views for explaining a method for processing a mirror wafer for the mirrors of FIGS. 2A and 2B;

FIGS. 9A and 9B are cross-sectional views for explaining a chip separation process of the mirror driver wafer and the mirror wafer of FIG. 8C;

FIG. 12 is a cross-sectional view illustrating a modification of the package of FIG. 5.

DETAILED DESCRIPTION OF EXEMPLARY EMBODIMENTS

Figure 1:
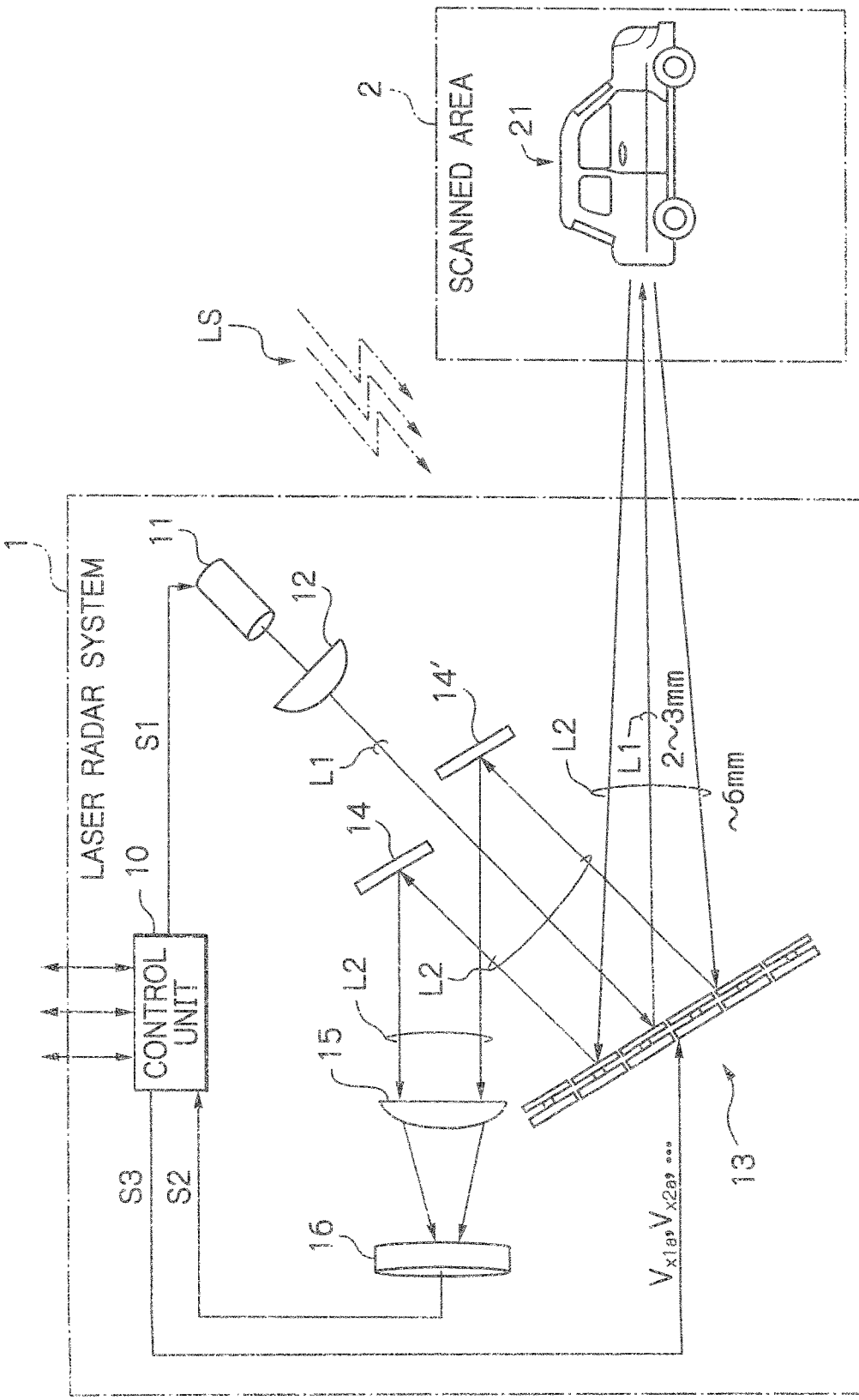
FIG. 1 is a schematic view illustrating an embodiment of the laser radar system according to the presently disclosed subject matter.

In FIG. 1, which is a schematic view illustrating an embodiment of the laser radar system according to the presently disclosed subject matter, a laser radar system 1, that may be mounted on a driver's vehicle, monitors an object such as a preceding vehicle 21 in a scanned area 2 to detect a distance and angle between the driver's vehicle and the preceding vehicle 21. For example, the distance between the driver's vehicle and the preceding vehicle 21 may be 100 m.

The laser radar system 1 is constructed by a control unit 10 such as a microcomputer, a single laser light source 11, a projection lens 12, a biaxial optical deflector (mirror array) 13, two or more fixed mirrors 14 and 14', a light convergence lens 15 and a photo detector 16.

The laser light source 11 is driven by a signal S1 from the control unit 10 to emit an about 2 to 3 mm beam-diameter collimated laser beam L1 which passes through the projection lens 12 to the biaxial optical deflector 13. Note that the signal S1 of the control unit 10 is also used for controlling the brightness of the laser light source 11.

The laser beam L1 is deflected by the biaxial optical deflector 13, so that the laser beam L1 is emitted from the laser radar system 1. As a result, the preceding vehicle 21 in the scanned area 2 would be irradiated with the laser beam L1.

When the preceding vehicle 21 is irradiated with laser beam L1, the preceding vehicle 21 returns a reflected laser beam L2 whose beam-diameter is about 6 mm to the laser radar system 1.

In the laser radar system 1, the laser beam L2 is reflected by the biaxial optical deflector 13, and then, is reflected by the fixed mirrors 14 and 14' to pass through the light convergence lens 15 to the photo detector 16. Note that the light convergence lens 15 serves as an iris to increase the power density of the laser beam L2.

The laser beam L2 is converted by the photo detector 16 into an electrical signal S2 which is transmitted to the control unit 10.

The control unit 10 can calculate a distance between the driver's vehicle and the preceding vehicle 21 in accordance with the difference between the signals S1 and S2, a speed of the preceding vehicle 21 relative to that of the driver's vehicle, a magnitude of the preceding vehicle 21 and the like.

Figure 3:
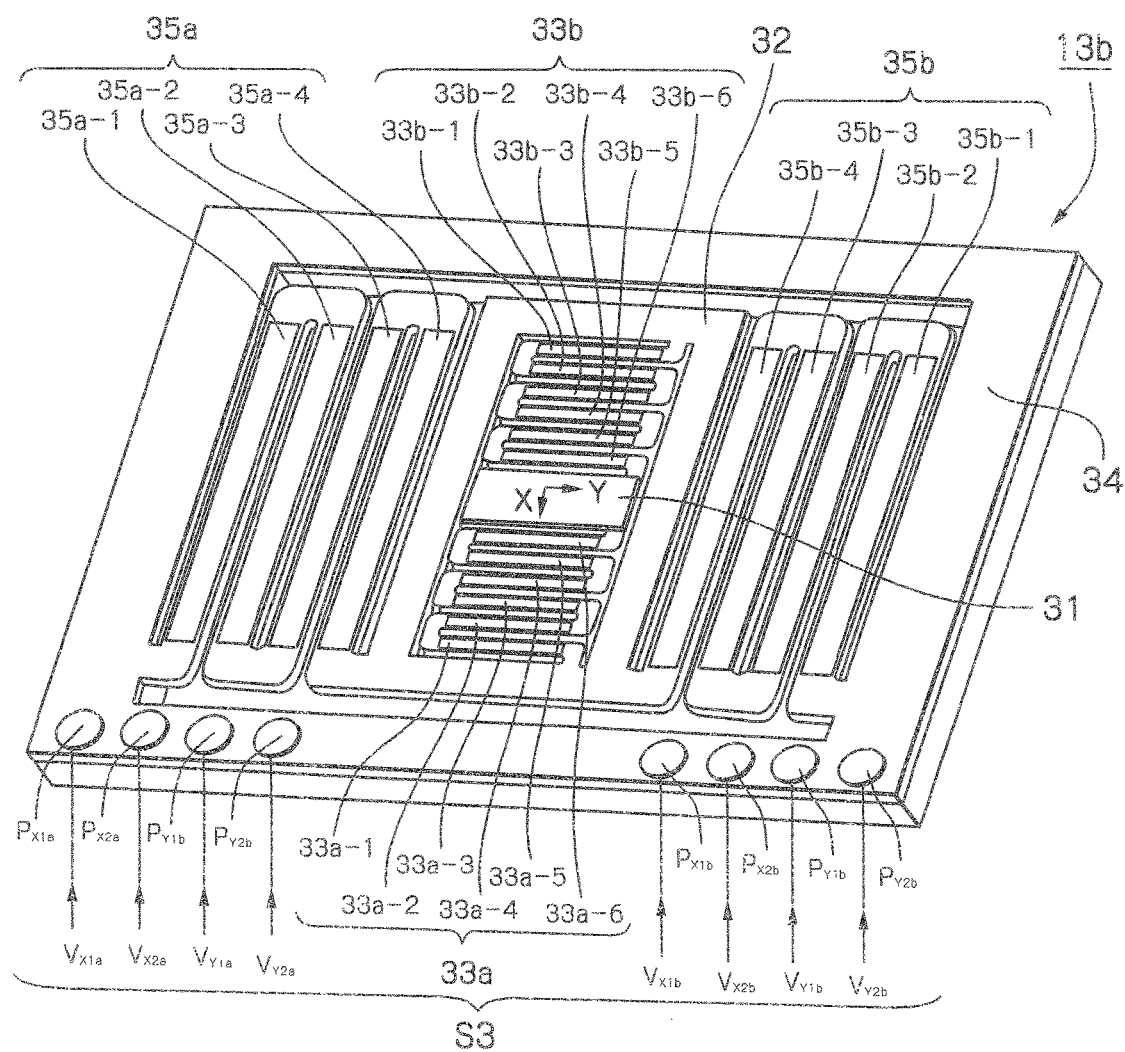
FIG. 3 is a perspective view of the mirror driver of FIG. 2B.

Also, the control unit 10 generates a signal S3 including voltages $V_{x1a}$, $V_{x2a}$, ... of FIG. 3 for controlling the biaxial optical deflector 13.

The control unit 10 is connected to other units such as a liquid crystal display (LCD) unit, a vehicle speed control unit and the like. For example, when the distance between the driver's vehicle and the preceding vehicle becomes smaller than a predetermined value, the vehicle speed control unit deaccelerates the driver's vehicle, while, when the distance between the driver's vehicle and the preceding vehicle becomes larger than a predetermined value, the vehicle speed control unit accelerates the driver's vehicle.

As explained above, the beam-diameter of the laser beam L1 is about 2 to 3 mm, while the beam-diameter of laser beam L2 is about 6 mm. In this case, if the biaxial optical deflector 13 has a size of 6 mm×6 mm, the biaxial optical deflector 13 can sufficiently deflect both of the laser beam L1 and the laser beam L2.

The laser radar system 1 constitutes a coaxial optical system where both of the laser beam L1 and the laser beam L2 are deflected. Therefore, even if external disturbances LS are present, such as a solar beam passing between the fixed mirrors 14 and 14', such external disturbances LS would not reach the photo detector 16. As a result, the noise caused by the external disturbances LS can be reduced to increase the detection sensitivity.

Figure 2A:
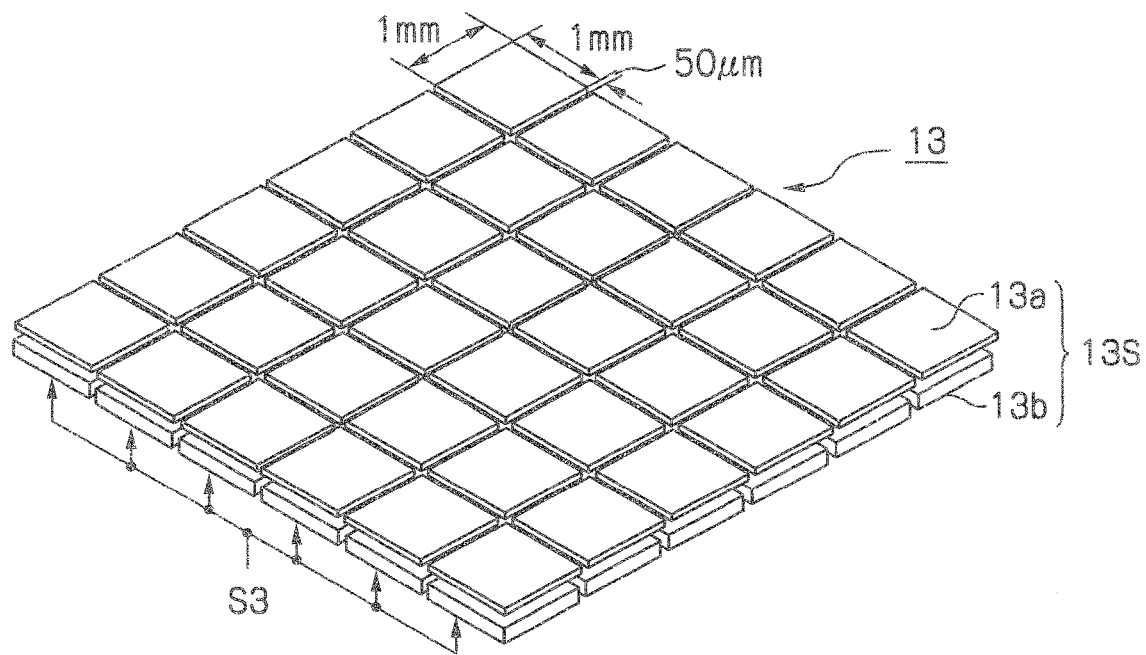
FIG. 2A is a perspective view of the biaxial optical deflector of FIG. 1.

In FIG. 2A, which is a perspective view of the biaxial optical deflector (mirror array) 13 of FIG. 1, the biaxial optical deflector 13 is constructed by 36 (=6 rows×6 column) small mirror units (two-dimensional optical deflectors) 13S at a spacing of about 50 μm arranged in an array.

Each of the mirror units 13S has a size of 1 mm×1 mm, and therefore, the biaxial optical deflector 13 has a size of 6 mm×6 mm or more. Note that the biaxial optical deflector 13 actually includes a package 51 (see: FIG. 5).

Each of the mirror units 13S includes one mirror 13a and one mirror driver 13b. The mirror drivers 13b are synchronously operated, so that the mirrors 13a synchronously carry out biaxial operations. Thus, the mirrors 13a altogether serve as one large mirror. As a result, four of the mirror units 13S at the center of the biaxial optical deflector 13 can deflect the laser beam L1 of FIG. 1 with a 2 mm beam-diameter, while all of the mirror units 13S can deflect the laser beam L2 of FIG. 1 with a 6 mm beam-diameter.

In FIG. 2A, since the mirrors 13a are spaced at a distance of 50 μm, the occupation ratio of the mirrors 13a over the biaxial optical deflector 13 is about 92%. Although the reflectivity at the gap between the mirrors 13a is low, if the above occupation ratio is larger than 90%, the mirrors 13a can substantially serve as a single large mirror. However, the larger the above-mentioned occupation ratio, the more complete the biaxial optical deflector 13. Preferably, the distance between the mirrors 13a is less than 50 μm, so that the occupation ratio is more than 95%.

As illustrated in FIG. 2A, all the mirror drivers 13b are commonly controlled by the control signal S3 from the control unit 10, so that all the mirrors 13a can synchronously perform the same deflecting operation. However, the mirror drivers 13b can be independently controlled by separate control signals from the control unit 10. In this case, the inner-side mirrors 13a can perform small deflecting operations so that the space between the inner-side mirrors 13a is small while the outer-side mirrors 13a can perform large deflecting operations so that the space between the outer-side mirrors 13a is large. Also, the flexing angles of the mirrors 13a can be adjusted by sense signals of angle sensors (not shown) incorporated into the mirror drivers 13b, to thereby precisely control the flexing amounts of the mirrors 13a.

Figure 2B:
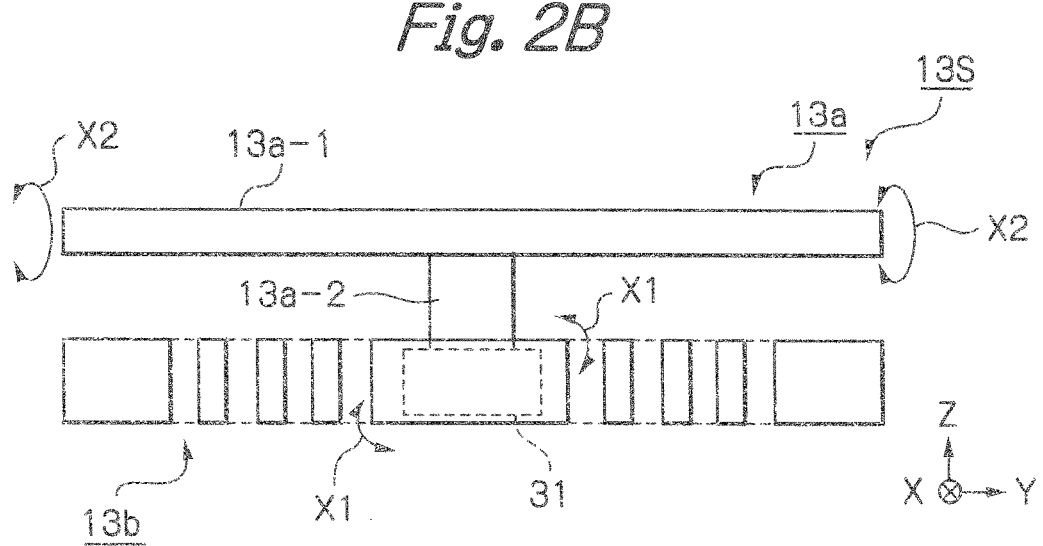
FIG. 2B is a cross-sectional view of one of the mirror units of FIG. 2A.
Figures 8A, 8B, 8C:
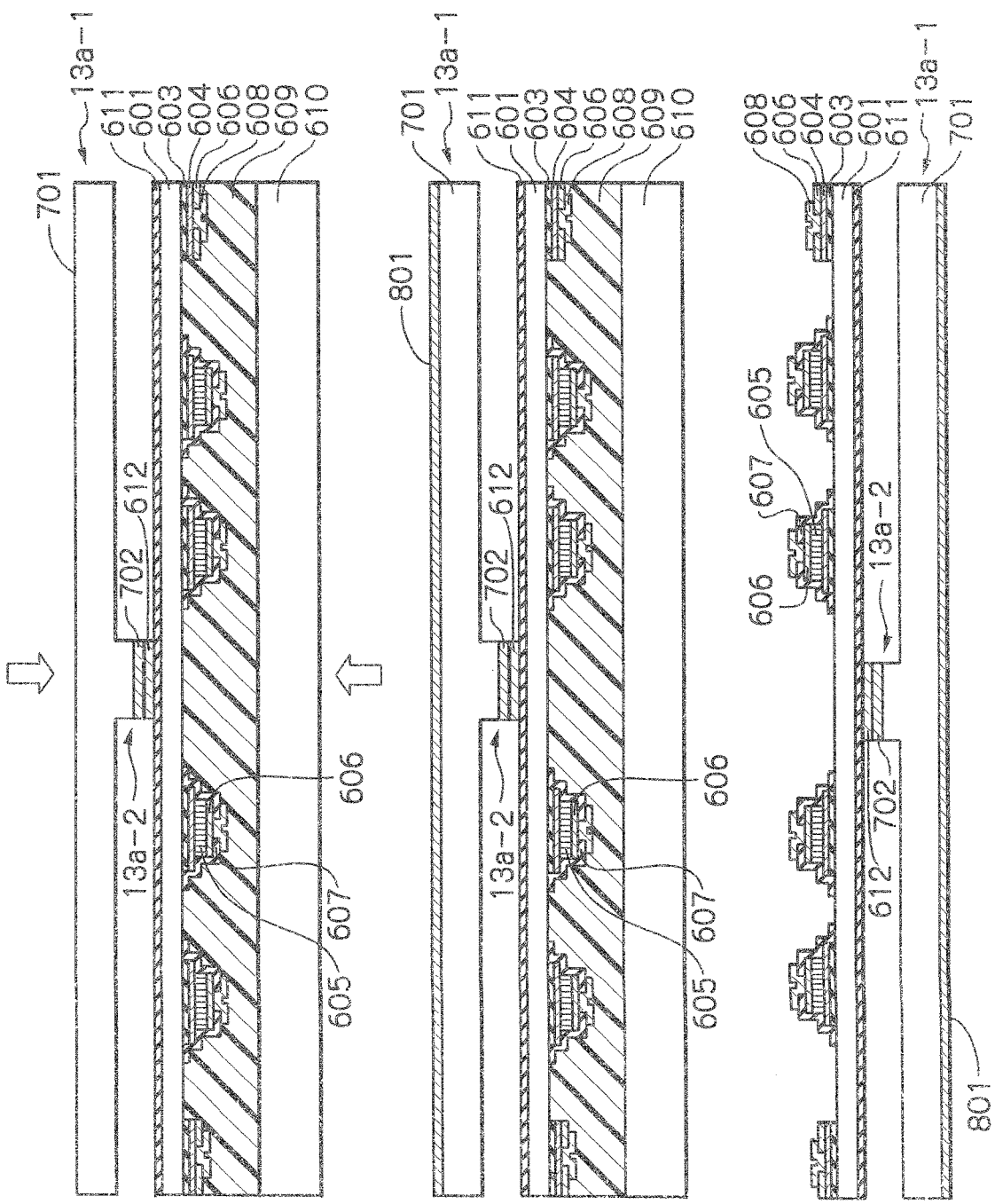
FIGS. 8A, 8B and 8C are cross-sectional views for explaining a wafer bonding process of the mirror driver wafer of FIG. 6K and the mirror wafer of FIG. 7C.

In FIG. 2B, which is a cross-sectional view of one of the mirror units 13S of FIG. 2A, the mirror 13a is constructed by a mirror element 13a-1 including an Au reflective layer 801 (see: FIG. 8B) formed thereon and a mirror support pole 13a-2 supporting the mirror element 13a-1 at the center thereof. The mirror support pole 13a-2 is fixed to a mirror support plate 31 of the mirror driver 13b. Therefore, when the mirror support plate 31 is two-dimensionally rocked as indicated by arrows X1, the mirror element 13a-1 is also two-dimensionally rocked as indicated by arrows X2.

Note that the mirror support plate 31 can be rectangular, circular or elliptical viewed from the top.

The mirror driver 13b of FIGS. 2A and 2B is explained in more detail next with reference to FIG. 3. The mirror driver 13b includes a two-dimensional piezoelectric actuator (32~35) for two dimensionally rocking the mirror support plate 31.

The mirror driver 13b is further constructed by an inner frame (movable frame) 32 surrounding the mirror support plate 31, a pair of meander-type inner piezoelectric actuators 33a and 33b fixed between the inner frame 32 and the mirror support plate 31 and serving as cantilevers for rocking the mirror support plate 31 with respect to an X-axis of the mirror support plate 31, an outer frame (fixed frame) 34 surrounding the inner frame 32, and a pair of meander-type outer piezoelectric actuators 35a and 35b fixed between the outer frame 34 and the inner frame 32 and serving as cantilevers for rocking the mirror support plate 31 through the inner frame 32 with respect to a Y-axis of the mirror support plate 31 perpendicular to the X-axis.

The inner frame 32 is rectangularly-framed to surround the mirror support plate 31 associated with the inner piezoelectric actuators 33a and 33b.

The inner piezoelectric actuators 33a and 33b oppose each other with respect to the mirror support plate 31. The inner piezoelectric actuators 33a and 33b have ends coupled to the inner circumference of the inner frame 32 and other ends coupled to the mirror support plate 31, in order to rock the mirror support plate 31 with respect to the X-axis.

The inner piezoelectric actuator 33a is constructed by piezoelectric cantilevers 33a-1, 33a-2, 33a-3, 33a-4, 33a-5 and 33a-6 which are serially-coupled from the inner frame 32 to the mirror support plate 31. Also, each of the piezoelectric cantilevers 33a-1, 33a-2, 33a-3, 33a-4, 33a-5 and 33a-6 are in parallel with the Y-axis of the mirror support plate 31. Therefore, the piezoelectric cantilevers 33a-1, 33a-2, 33a-3, 33a-4, 33a-5 and 33a-6 are folded at every cantilever or meandering from the inner frame 32 to the mirror support plate 31, so that the amplitudes of the piezoelectric cantilevers 33a-1, 33a-2, 33a-3, 33a-4, 33a-5 and 33a-6 can be changed along directions perpendicular to the X-axis of the mirror support plate 31.

Similarly, the inner piezoelectric actuator 33b is constructed by piezoelectric cantilevers 33b-1, 33b-2, 33b-3, 33b-4, 33b-5 and 33b-6 which are serially-coupled from the inner frame 32 to the mirror support plate 31. Also, each of the piezoelectric cantilevers 33b-1, 33b-2, 33b-3, 33b-4, 33b-5 and 33b-6 are in parallel with the Y-axis of the mirror support plate 31. Therefore, the piezoelectric cantilevers 33b-1, 33b-2, 33b-3, 33b-4, 33b-5 and 33b-6 are folded at every cantilever or meandering from the inner frame 32 to the mirror support plate 31, so that the amplitudes of the piezoelectric cantilevers 33b-1, 33b-2, 33b-3, 33b-4, 33b-5 and 33b-6 can be changed along directions perpendicular to the X-axis of the mirror support plate 31.

Note that the number of piezoelectric cantilevers in the inner piezoelectric actuator 33a and the number of piezoelectric cantilevers in the inner piezoelectric actuator 33b can be other values such as 2, 4, 8, . . . .

The outer frame 34 is rectangularly-framed to surround the inner frame 32.

The outer piezoelectric actuators 35a and 35b are coupled between the inner circumference of the outer frame 34 and the outer circumference of the inner frame 32, in order to rock the inner frame 32 associated with the mirror support plate 31 with respect to the outer frame 34, i.e., to rock the mirror support plate 31 with respect to the Y-axis.

The outer piezoelectric actuator 35a is constructed by piezoelectric cantilevers 35a-1, 35a-2, 35a-3 and 35a-4 which are serially-coupled from the inner frame 32 to the outer frame 34. Also, each of the piezoelectric cantilevers 35a-1, 35a-2, 35a-3 and 35a-4 are in parallel with the X-axis of the mirror support plate 31. Therefore, the piezoelectric cantilevers 35a-1, 35a-2, 35a-3 and 35a-4 are folded at every cantilever or meandering from the outer frame 34 to the inner frame 32, so that the amplitudes of the piezoelectric cantilevers 35a-1, 35a-2, 35a-3 and 35a-4 can be changed along directions perpendicular to the Y-axis of the mirror support plate 31.

Similarly, the outer piezoelectric actuator 35b is constructed by piezoelectric cantilevers 35b-1, 35b-2, 35b-3 and 35b-4 which are serially-coupled from the inner frame 32 to the outer frame 34. Also, each of the piezoelectric cantilevers 35b-1, 35b-2, 35b-3 and 35b-4 are in parallel with the X-axis of the mirror support plate 31. Therefore, the piezoelectric cantilevers 35b-1, 35b-2, 35b-3 and 35b-4 are folded at every cantilever or meandering from the outer frame 35 to the inner frame 32, so that the amplitudes of the piezoelectric cantilevers 35b-1, 35b-2, 35b-3 and 35b-4 can be changed along directions perpendicular to the Y-axis of the mirror support frame 31.

Note that the number of piezoelectric cantilevers in the outer piezoelectric actuator 35a and the number of piezoelectric cantilevers in the outer piezoelectric actuator 35h can be other values such as 2, 6, 8, . . . .

Provided on the outer frame 34 are pads $P_{Ra}$, $P_{Y2a}$, $P_{X1a}$, $P_{X2a}$, $P_{Y1a}$ and $P_{Y2a}$ $P_{X1a}$, $P_{X2b}$, $P_{Y1b}$ and $P_{Y2b}$ which receive the control signal S3. In this case, the control signal S3 includes voltages $V_{X1a}$ and $V_{X2a}$ opposite in phase with each other for the inner piezoelectric actuator 33a, voltages $V_{X1b}$ and $V_{X2b}$ opposite in phase with each other for the inner piezoelectric actuator 33h, voltages $V_{Y1a}$ and $V_{Y2a}$ opposite in phase with each other for the inner piezoelectric actuator 35a, and voltages $V_{Y1b}$ and $V_{Y2b}$ opposite in phase with each other for the inner piezoelectric actuator 35b.

The pad $P_{X1a}$ is connected to the upper electrode layers 606 (see: FIG. 6C) of the odd-numbered piezoelectric cantilevers 33a-1, 33a-3 and 33a-b of the inner piezoelectric actuator 33a, and the pad $P_{X2a}$ is connected to the upper electrode layers 606 (see: FIG. 6C) of the even-numbered piezoelectric cantilevers 33a-2, 33a-4 and 33a-6 of the inner piezoelectric actuator 3a.

The pad $P_{X1b}$ is connected to the upper electrode layers 606 (see: FIG. 6C) of the odd-numbered piezoelectric cantilevers 33b-1, 33b-3 and 33b-6 of the inner piezoelectric actuator 33b, and the pad $P_{X2b}$ is connected to the upper electrode layers 606 (see: FIG. 6C) of the even-numbered piezoelectric cantilevers 33b-2, 33b-4 and 33b-6 of the inner piezoelectric actuator 35b.

The pad $P_{Y1a}$ is connected to the upper electrode layers 606 (see: FIG. 60 of the odd-numbered piezoelectric cantilevers 35a-1 and 35a-3 of the outer piezoelectric actuator 35a, and the pad $P_{Y2a}$ is connected to the upper electrode layers 606 (see: FIG. 6C) of the even-numbered piezoelectric cantilevers 35a-2 and 35a-4 of the outer piezoelectric actuator 35a.

The pad $P_{Y1b}$ is connected to the upper electrode layers 606 (see: FIG. 6C) of the odd-numbered piezoelectric cantilevers 35b-1 and 35b-3 of the outer piezoelectric actuator 35b, and the pad $P_{Y2b}$ is connected to the upper electrode layers 606 (see: FIG. 6C) of the even-numbered piezoelectric cantilevers 35b-2 and 35b-4 of the outer piezoelectric actuator 35b.

The meander-type piezoelectric actuator such as 35a operate as follows.

In the piezoelectric actuator 35a, the piezoelectric cantilevers 35a-1, 35a-2, 35a-3 and 35a-4 are divided into an odd-numbered group of the piezoelectric cantilevers 35a-1 and 35a-3, and an even-numbered group of the piezoelectric cantilevers 35a-2 and 35a-4 alternating with the odd-numbered group of the piezoelectric cantilevers 35a-1 and 35a-3.

Figure 4A:
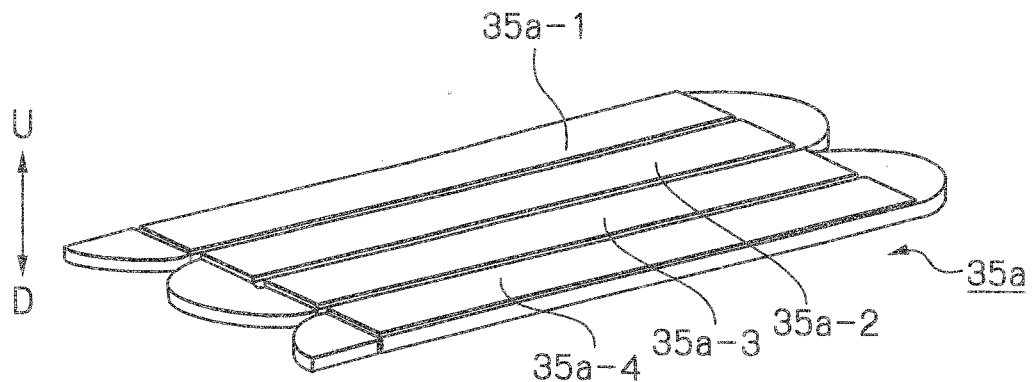
FIGS. 4A and 4B are perspective views for explaining a non-operation state and an operation state, respectively, of the piezoelectric cantilevers of one piezoelectric actuator of FIG. 3.
Figure 4B:
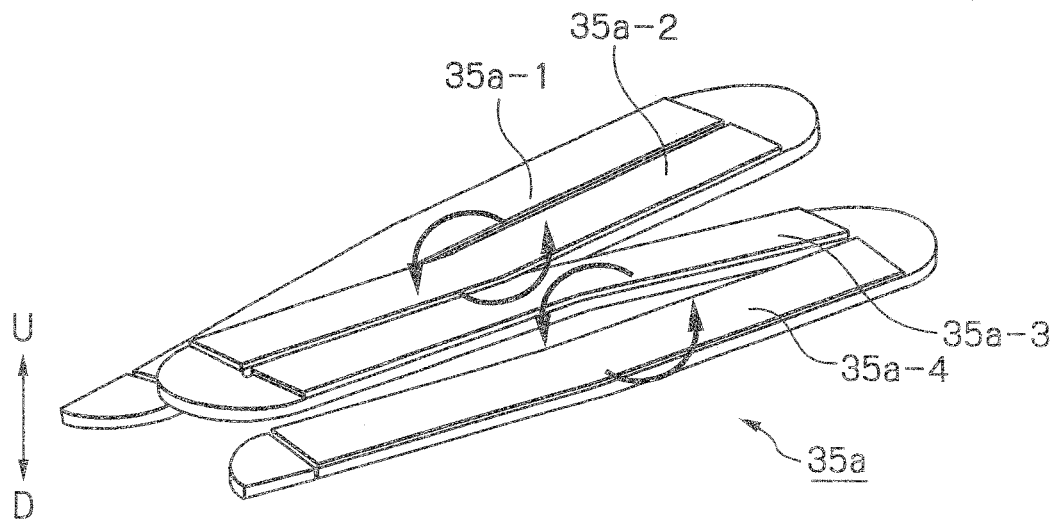

When no drive voltages are applied to the piezoelectric cantilevers 35a-1, 35a-2, 35a-3 and 35a-4, the piezoelectric cantilevers 35a-1, 35a-2, 35a-3 and 35a-4 are as illustrated in FIG. 4A.

On the other hand, a drive voltage $V_{Y1a}$ is applied to the odd-numbered group of the piezoelectric cantilevers 35a-1 and 35a-3 and a drive voltage $V_{Y2a}$ opposite in phase to the drive voltage $V_{Y1a}$ is applied to the even-numbered group of the piezoelectric cantilevers 35a-2 and 35a-4. For example, the odd-numbered group of the piezoelectric cantilevers 35a-1 and 35a-3 are flexed in one direction, for example, in a downward direction D, and the even-numbered group of the piezoelectric cantilevers 35a-2 and 35a-4 are flexed in the other direction, i.e., in an upward direction U. Otherwise, the odd-numbered group of the piezoelectric cantilevers 35a-1 and 35a-3 are flexed in the upward direction U, and the even-numbered group of the piezoelectric cantilevers 35a-2 and 35a-4 are flexed in the downward direction D.

Thus, the mirror support plate 31 is rocked around the Y-axis by the piezoelectric cantilevers 35a-1, 35a-2, 35a-3 and 35a-4.

In FIG. 5, which illustrates a package on which the mirror units 13S are mounted, the front side of the mirror units 13S on which the pads $P_{X1a}, P_{X2a}, \ldots, P_{Y2b}$ of FIG. 3 are formed are faced down on a package 51 formed by high temperature co-fined ceramic (HTCC). In this case, Au bumps 52 or ball soldering bumps are provided between the pads $P_{X1a}, P_{X2a}, \ldots, P_{Y2b}$ of FIG. 3 and the package 51. Also, recesses (not shown) are perforated in the surface of the package 51, so that the piezoelectric actuators 33a, 33b, 35a and 35b of FIG. 3 can be surely rocked. The bumps 52 are electrically connected via interconnects 53 within the package 51 to terminals 54 on the rear side thereof. Finally, the package 51 is mounted on a printed circuit board 55 for a laser radar system on which the control unit 10 and the like are also mounted.

A method for manufacturing the biaxial optical deflector 13 of FIGS. 2A and 2B will be explained in more detail with reference to FIGS. 6A through 6K, 7A through 7D, and 8A and 8B, 9A and 9B, and 10.

Mirror Driver Wafer Processing

Figure 6A:
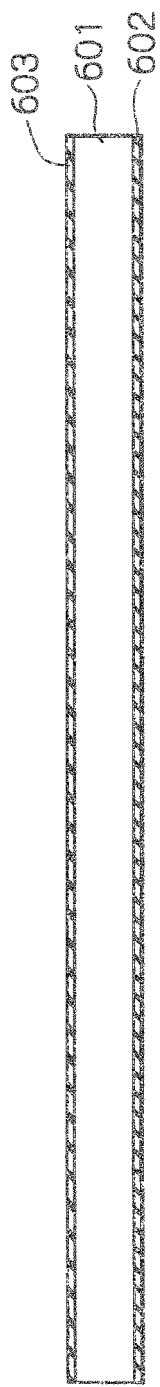

First, referring to FIG. 6A, a bare monocrystalline silicon wafer (substrate) 601 made of an about 400 µm thick monocrystalline silicon having polished surfaces is prepared. Then, the bare monocrystalline silicon wafer 601 is oxidized by a thermal oxidation process, so that about 1 µm thick silicon dioxide layers 602 and 603 are formed on both surfaces of the bare monocrystalline silicon wafer 601.

Figure 6B:
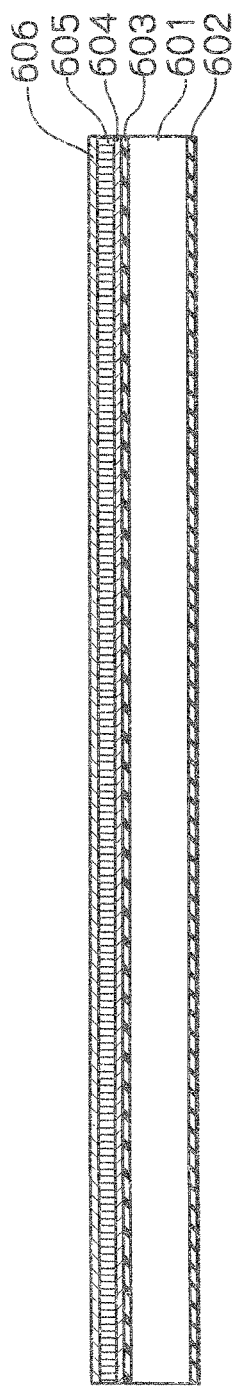
Figure 6C:
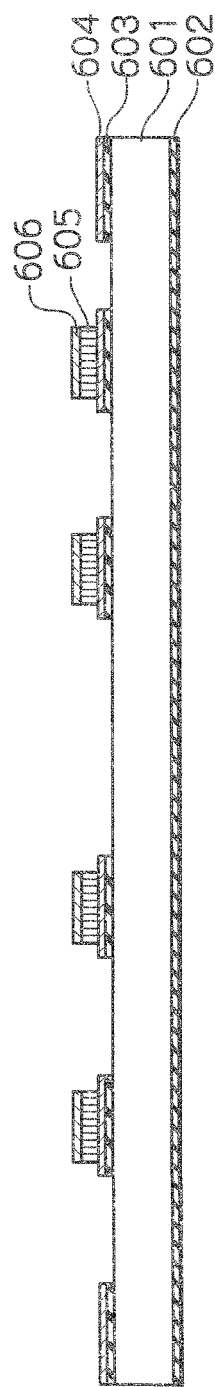

Next, referring to FIG. 6B, a Pt/Ti lower electrode layer 604 consisting of an about 50 nm thick Ti and an about 150 nm thick Pt on Ti is formed by a sputtering process. Then, an about 3 µm thick lead titanate zirconate (PZT) layer 605 is deposited on the lower electrode layer 604 by an arc discharge reactive ion plating (ADRIP) process at a temperature of about 500° C. to 600° C. Then, an about 150 nm thick Pt upper electrode layer 606 is formed on the PZT layer 605 by a sputtering process.

Next, referring to FIG. 6C, the upper electrode layer 606 and the PZT layer 605 are patterned by a photolithography and etching process. Then, the lower electrode layer 604 and the silicon dioxide layer 603 are patterned by a photolithography and etching process.

Figure 6D:
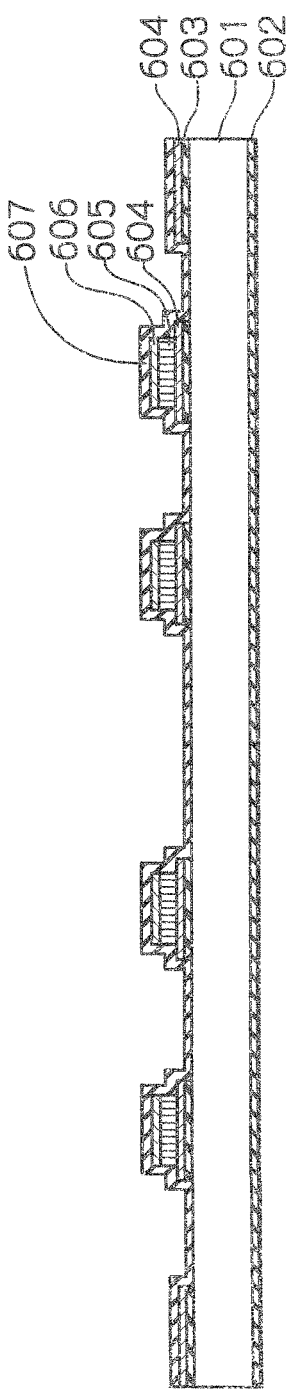

Next, referring to FIG. 6D, an about 500 nm thick silicon dioxide interlayer 607 is formed on the entire surface by a plasma-enhanced chemical vapor deposition (PCVD) process.

Next, referring to FIG. 6E, contact holes CONT are perforated in the silicon dioxide interlayer 607 by a photolithography and dry etching process. The contact holes CONT correspond to the piezoelectric actuators 33a, 33b, 35a and 35b, the pads $P_{x1a}, P_{X2a}, P_{Y1a}, P_{Y2a}, P_{X1b}, P_{X2b}, P_{Y1b}$ and $P_{Y2b}$.

Next, referring to FIG. 6F, wiring layers 608 made of AlCu (1% Cu) are formed by a photolithography process, a sputtering process, and a lift-off process, or by a sputtering process and a photolithography/etching process using mixed acid. The wiring layers 608 are electrically connected between the upper electrode layers 606 of the piezoelectric actuators 33a, 33b, 35a and 35b, and their corresponding piezoelectric actuators 33a, 33b, 35a and 35b.

Next, referring to FIG. 6G, the silicon dioxide layer 602 is removed by a dry etching process.

Next, referring to FIG. 6H, a wax layer 609 is coated on the entire front surface, and a support wafer 610 is temporarily bonded to the wax layer 609.

Next, referring to FIG. 6I, a chemical mechanical polishing (CMP) process is performed upon the entire rear-side surface, so that the silicon substrate 601 becomes about 50 µm thick.

Next, referring to FIG. 6J, a protection layer 611 made of silicon nitride is deposited on the entire rear surface by a sputtering process.

Finally, referring to FIG. 6K, an Au layer 612 deposited on the protection layer 611 by a sputtering process and a photolithography/etching process. The Au layer 612 is used for wafer bonding process which will be explained later.

Mirror Wafer Processing Step

First, referring to FIG. 7A, a bare monocrystalline silicon wafer (substrate) 701 made of about 300 µm thick monocrystalline silicon having polished surfaces is prepared. Then, an Au layer 702 is deposited on the rear surface of the monocrystalline silicon wafer 701 by a PCVD process. Note that an underlayer (not shown) made of TiW is interposed between the monocrystalline silicon wafer 701 and the Au layer 702, to avoid the formation of suicide. The Au layer 702 is used for a wafer bonding process which will be later explained.

Next, referring to FIG. 7B, a resist pattern 702 for a deep reactive ion etching (DRIE) process is formed on the Au layer 702.

Finally, referring to FIG. 7C, the Au layer 702 and the monocrystalline silicon wafer 701 is etched by a DRIE process using the resist pattern 703 as a mask. As a result, the thickness of the monocrystalline silicon wafer 701 becomes about 200 µm. In this case, the monocrystalline silicon wafer 701 corresponds to the mirror element 13a-1 of FIG. 2B, and its protruded portion corresponds to the mirror support pole 13a-2 of FIG. 2B.

Wafer Bonding Process

First, while the Au layer 702 of FIG. 7C is aligned with the Au layer 612 of FIG. 6K, the wafer of FIG. 7C is bonded onto the wafer of FIG. 6K by thermally-pressuring the wafer of FIG. 7C to the wafer of FIG. 6K at a pressure of less than 0.1 atm, at a temperature of about 300° C. and at a weight of 7000 N for about 10 minutes. As a result, the wafers of FIGS. 6K and 7D are bonded by an Au—Au solid diffusion bonding, thus securing a strong bonding therebetween.

Note that, the wafers of FIGS. 6K and 7D are bonded by an Au—Au solid diffusion bonding as illustrated in FIG. 8A. However, the wafers of FIGS. 6K and 7D can be bonded by a Cu—Cu solid diffusion bonding. Also, an AuSn eutectic bonding, an adhesive bonding using epoxy resin, an anode oxidation bonding for bonding silicon and glass, or a glass frit bonding without lead at a low melting point can be used.

Next, referring to FIG. 8B, an Au reflective layer 801 is deposited on the front surface of the monocrystalline silicon wafer 701 by a sputtering process. In this case, note that an underlayer made of TiW (not shown) is interposed between the monocrystalline silicon wafer 701 and the Au layer 801, to avoid the formation of silicide.

Finally, referring to FIG. 8C, the bonded wafers are reversed. Then, the support wafer 610 is removed by melting the wax layer 609.

Chip Separating Step

First, referring to FIG. 9A, the bonded wafers are reversed. Then, the monocrystalline silicon wafer 601 is etched by a DRIE process, so that the mirror support plate 31, the inner frame 32, the inner piezoelectric actuators 33a and 33b, the outer frame 34, and the outer piezoelectric actuators 35a and 35b are separated from each other. Simultaneously, the dicing streets (not shown) are etched by the DRIE process, so that the mirror drivers 13b are separated from each other.

Finally, referring to FIG. 9B, the wafers are again reversed. Then, the mirror side of the wafer 701 is laser-diced, so that the mirrors 13a are separated from each other. Thus, each of the mirror units 13 is completed.

Packaging Step

Figure 10:
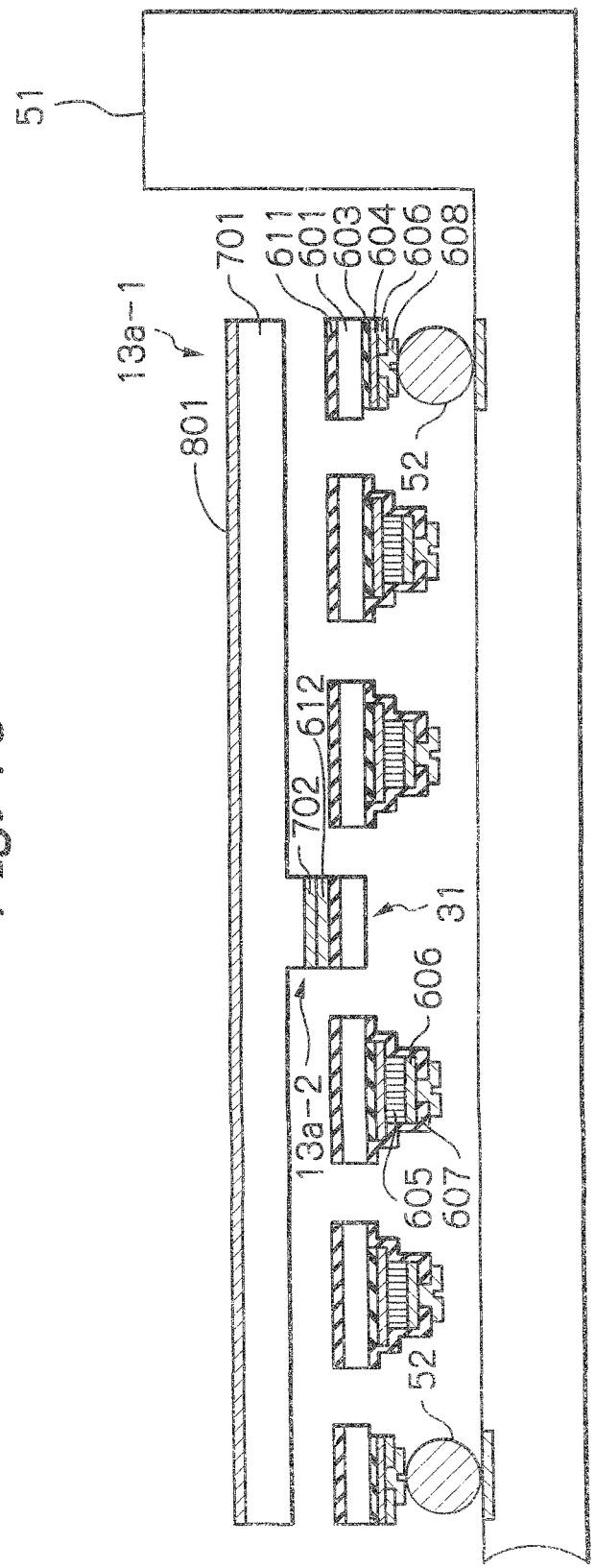
FIG. 10 is a cross-sectional view for explaining a packaging process of the biaxial optical deflector of FIG. 9B.

Referring to FIG. 10 corresponding to FIG. 5, each of the mirror units 13 is mounted on a package 51 by Au bumps 52.

Figure 11:
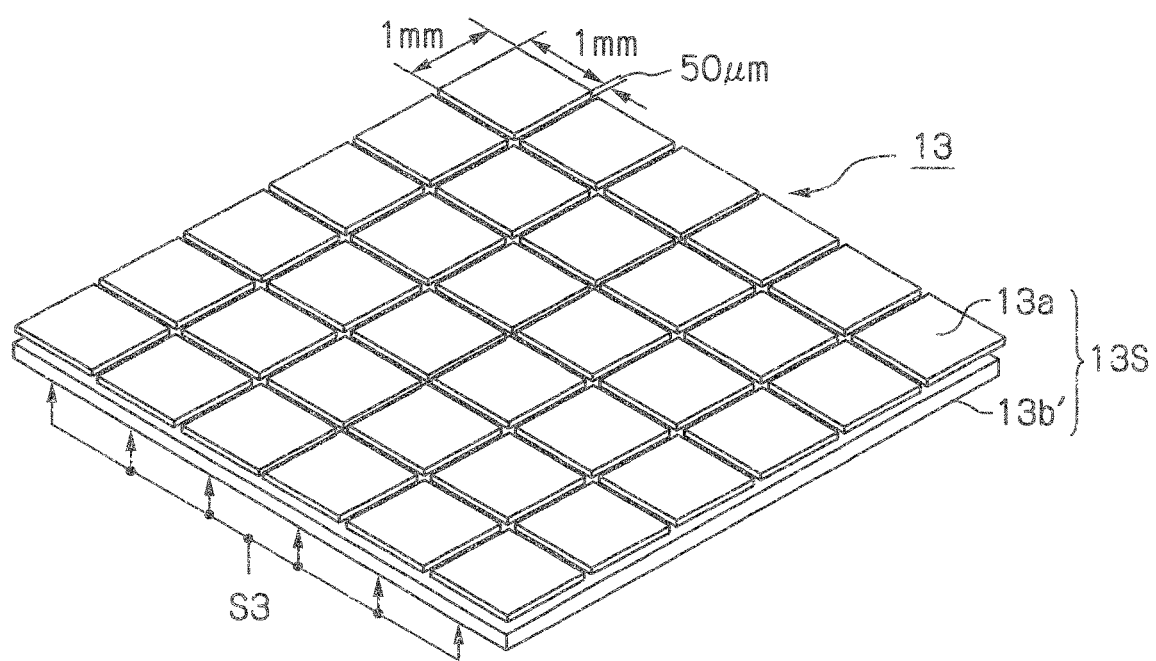
FIG. 11 is a perspective view illustrating a modification of the biaxial optical deflector of FIG. 2A.

In the above chip separation step, the dicing streets are provided for each of the mirror drivers 13b; however, the dicing streets can be provided for every 36 (=6×6) mirror drivers 13b. In this case, one mirror driver 13b' can be realized as illustrated in FIGS. 11 and 12.

According to the above-described embodiment, when the biaxial optical deflector 13 with the mirror units 13S having a size of 0.5 to 1 mm was operated at a high scanning speed of several kHz to several tens of kHz, the horizontal scanning angle was 60° to 140° at a resonant frequency operation and 25° to 50° at a non-resonant frequency operation, and the scanning angle was 40° to 100° at a resonant frequency operation and 20° to 40° at a non-resonant frequency operation. That is, both of the horizontal and vertical scanning angles can be increased.

In the above-described embodiment, each of the mirror drivers 13b is constructed by a two-dimensional meander-type piezoelectric actuator; however, the mirror drivers 13b can be constructed by other two-dimensional meander-type piezoelectric actuators such as torsion-bar type piezoelectric actuators. Further, each of the mirror drivers 13b can be electromagnetic type actuators using a Lorentz force between a magnetic field generated from a permanent magnet and a current flowing through a winding. Since such a Lorentz force is very large, a vertical scanning angle at a non-resonant low frequency operation can be increased.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A biaxial optical deflector, comprising:
    multiple mirror units arranged in an array, each of said mirror units including one mirror and one mirror driver coupled to said mirror for rocking said mirror,
    wherein said mirror comprises a mirror element and a mirror support pole supporting said mirror element at a center of said mirror element,
    wherein said mirror driver comprises a mirror support plate to which said mirror support pole is fixed, and a two-dimensional actuator for two-dimensionally rocking said mirror support plate, and
    wherein an occupation ratio of a total area of said mirror elements per an area of said mirror units is larger than 90%.

2. The biaxial optical deflector as set forth in claim 1, wherein said mirror support pole is fixed to said mirror support plate by one of a Au—Au solid diffusion bonding, a Cu—Cu solid diffusion bonding, an AuSn eutectic bonding, an adhesive bonding, an anode oxidation bonding, and a glass frit bonding.

3. The biaxial optical deflector as set forth in claim 1, wherein said two-dimensional actuator comprises meander-type piezoelectric actuators.

4. The biaxial optical deflector as set forth in claim 1, wherein said mirror drivers of said mirror units are coupled to each other.

5. The biaxial optical deflector as set forth in claim 1, wherein said mirror drivers are synchronously operated.

6. A laser radar system comprising:
    said biaxial optical deflector as set forth in claim 1;
    a control unit, connected to said biaxial optical deflector, for synchronously controlling said mirror drivers;
    a single light source, connected to said control unit, for emitting a first light beam to said biaxial optical deflector, so that said first light beam is reflected by said biaxial optical deflector to emit from said radar system; and
    a photo detector, connected to said control unit, for receiving a second light beam reflected by said biaxial optical deflector that receives said second light beam from outside of said radar system.

7. The laser radar system as set forth in claim 6, further comprising:
    fixed mirrors for reflecting said second light beam from said biaxial optical deflector; and
    a light convergence lens for receiving said second light beam from said fixed mirrors to transmit said second light beam to said photo detector.

8. A method for manufacturing said biaxial optical deflector as set forth in claim 1, the method comprising:

forming two-dimensional actuators on a front side of a first wafer;

forming mirror support poles on a rear side of a second wafer;

wafer-bonding the rear side of said second wafer onto a rear side of said first wafer so that said mirror support poles are in contact with the rear side of said first wafer;

etching said first wafer so that said two-dimensional actuators are separated from each other and said first wafer is separated into said mirror drivers, after said wafer-bonding;

dicing said second wafer so that said second wafer is separated into said mirrors, after said etching; and packaging said mirror drivers and said mirrors each fixed to one of said mirror drivers in a package.

9. The method as set forth in claim 8, further comprising:

forming a wax layer on said two-dimensional actuators, before said wafer-bonding;

bonding a support wafer on said wax layer, before said wafer-bonding; and removing said support wafer and said wax layer, after said wafer-bonding.

10. The method as set forth in claim 8, wherein said dicing comprises dicing said second wafer so that said second wafer is separated into said mirrors on a mirror-by-mirror basis.

11. The method as set forth in claim 8, wherein said dicing comprises dicing said second wafer so that said second wafer is separated into said mirrors as one array of mirrors.

* * * * *